A. HATFIELD.
Corn-Planter.
No. 21,958.
Patented Nov. 2, 1858.
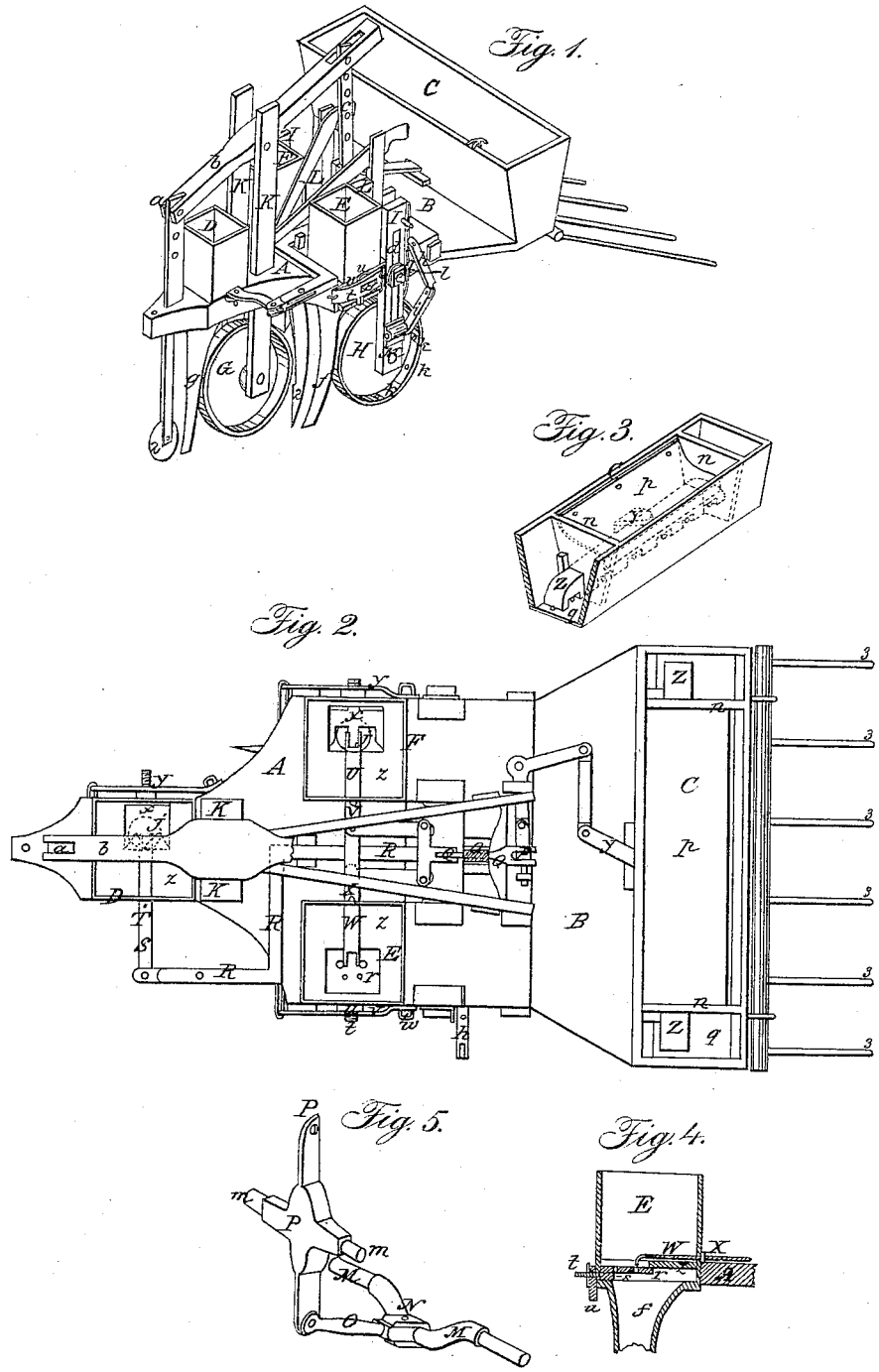

UNITED STATES PATENT OFFICE.

A. HATFIELD, OF PETERSBURG, ILLINOIS.

IMPROVEMENT IN SEEDING-MACHINES.

Specification forming part of Letters Patent No. 21,958, dated November 2, 1858.

*To all whom it may concern:*

Be it known that I, AARON HATFIELD, of Petersburg, in Menard county, in the State of Illinois, have invented a new and useful machine, which I call "The Illinois Farmer's Wheat-Drill," for drilling in wheat or grass-seed between rows of standing corn or elsewhere; and I do hereby declare that the following is a full, clear, exact, and accurate description of the construction and operation of the same, reference being had to the annexed drawings, making a part of this specification, of which—

Figure 1 is a perspective view of the machine. Fig. 2 represents a top plan. Figs. 3, 4, and 5 represent detached portions of the machine, that will be hereinafter referred to.

Similar letters of reference, where they occur in the several figures, denote like parts of the machine in all of them.

The nature of my invention consists in the particular manner in which I have arranged the seeding devices and operate them for drilling in grain or sowing it broadcast, one or both at the same time, and whether between corn-rows or otherwise.

To enable others skilled in the art to make and use my invention, I will proceed to describe the same with reference to the drawings.

The seed-boxes C D E F are all arranged upon a frame or platform, A B, which rests on wheels G H H, the wheels H H of which (one only being seen in the perspective) are arranged one on each side of the machine and the wheel G in the front center-line of the machine. The axles of the wheels have their bearings in standards or brackets I L, I L, K K. The standards I L are provided with slots $d$ and set-screws $e$, so as to adjust the platform to any proper height above the ground. The standards K K of the front axle or wheel, G, pass through slots in the platform, and are hung to a lever, $b$, which has its fulcrum at $a$, and the other end of which may be raised or lowered and adjusted to any of the holes in the upright $c$. It will be seen that by depressing the rear end of lever $b$ the platform will be placed in an inclined position, raising its front end and elevating the lower ends of the seed-tubes $g\ f\ f$, arranged underneath the seed-boxes D E F, above the ground, when it is desired to turn the machine around. The axle M M, upon which the wheels H H are placed, has a crank, N, near its center, which, by means of a connecting-rod, O, vibrates the cross-piece P upon its pivots $m\ m$. By this means the rod Q (pivoted to P) and the bar R are operated. The bar R serves to vibrate the seed-stirrers S U W, linked thereto, and pivoted at T V X, and also the arm Y, which actuates the notched bar Z in the seed-box C.

If it is desirable to stop the motion of the seed-stirrers and bar Z, the knuckle-joint $h\ i$ may be contracted, as represented in Fig. 1, so as to cause a stud or pin thereon at its lower end to enter one of the holes $k$ in the rim of one of the wheels H, thereby stopping the motion of the wheels H H and crank-axle M M. The knuckle-joint may be retained in this position by inserting the upper end of $h$ below one of the teeth of the rack $l$. If the machine is to be moved while the seeding devices are thus stopped from acting, the rear of the machine can be raised up so as to throw the weight on the wheel G, which is not a driving-wheel.

The seed-box C has two partitions, $n\ n$, provided with holes, through which the bar Z may vibrate. The notches cut in the under side of bar Z will alternately cover and open the holes in the bottom plate $q$ through which the seed passes out. A bent plate, $p$, serves to cover that portion of the bar Z which lies between the two partitions.

The bottom plate Z of the seed-box E has a square hole through it, and an additional bottom plate $r$, which is provided with two small and two large holes for the passage of different kinds of seeds from the hopper into the seed-tube $f$. Either of the sets of holes may be closed up by bringing the slide $s$ under them. This may be done by removing the wedge $w$, withdrawing the stirrup $v$, and turning the nut $u$ so as to move the screw $t$ and the slide $s$, attached to the screw. As soon as the slide has been properly adjusted it may be permanently fixed in its position by replacing the stirrup and wedge, which will prevent the nut $u$ from working loose.

The two seed-boxes F and D are similarly constructed, only that they have no plate corresponding to the additional bottom plate $r$ in the seed-box E, and have each a notched plate, $x$, instead of the slide $s$, which plates $x$, however, can be adjusted similarly by means of stirrups, nuts, and screws $y$, so as to cover up the holes $j$ of the seed-tubes $g\,f$ to a greater or less extent, and thereby to allow passage to corresponding quantities of seed or grain. The seed-hoppers D E F are arranged for drilling in the seed or grain, while that C at the rear of the machine is arranged for sowing broadcast, and they may be differently disposed of on the frame of the machine, if found desirable.

There are cutters 2 2, &c., placed in advance of each seeding-tube to open a slight furrow, and the wheels are arranged immediately behind the seed-tubes, so as to roll over and cover the planted seed.

For covering the seed that is sown broadcast a rake, 3, may be hinged behind the machine, which in dragging over the ground will cover them.

Having thus fully described the nature and object of my invention, what I claim therein as new, and desire to secure by Letters Patent, is—

The arrangement of the seed-hoppers herein represented, in combination with the mechanism for driving the seed-slides and dropping the grain or seeds and covering them, as herein described and shown.

AARON HATFIELD.

Witnesses:
BARBOUR LEWIS,
H. B. McCLURE.